United States Patent [19]

Schopper

[11] 4,392,511
[45] Jul. 12, 1983

[54] PRESSURE REGULATOR

[75] Inventor: Bernd Schopper, Frankfurt, Fed. Rep. of Germany

[73] Assignee: ITT Industries, Inc., New York, N.Y.

[21] Appl. No.: 282,292

[22] Filed: Jul. 10, 1981

Related U.S. Application Data

[63] Continuation of Ser. No. 121,548, Feb. 14, 1980, abandoned.

[30] Foreign Application Priority Data

Mar. 26, 1979 [DE] Fed. Rep. of Germany ....... 2911886

[51] Int. Cl.³ ............................................. F16K 17/26
[52] U.S. Cl. .............................. 137/493.2; 137/493.9; 303/66; 188/349
[58] Field of Search ................... 137/493, 493.1, 493.2, 137/493.9; 303/6 C; 188/349

[56] References Cited

U.S. PATENT DOCUMENTS

| 3,283,504 | 11/1966 | Stelzer | 303/6 C X |
| 3,423,936 | 1/1969 | Stelzer | 303/6 C |
| 3,531,163 | 9/1970 | Stelzer | 303/6 C |
| 3,659,902 | 5/1972 | Kisk | 137/493.2 X |
| 3,836,204 | 9/1974 | Van Wicklin | 303/6 C |
| 4,113,317 | 9/1978 | Farr | 303/6 C |

Primary Examiner—Harold W. Weakley
Attorney, Agent, or Firm—John T. O'Halloran; Alfred C. Hill

[57] ABSTRACT

In general pressure regulators for motor vehicle brake systems are arranged in the pressure medium line between the master brake cylinder and at least one wheel brake cylinder. The pressure regulator comprises a plunger valve with different pressure surfaces, which above a certain pressure level, reduce the brake pressure of the rear axle compared to the brake pressure of the front axle. In order to achieve a high reliableness and a simple construction of the pressure regulator, a non-return valve in the form of a sealing lip movable by a movable part of the plunger valve is provided. The sealing lip extends into the inlet chamber when the plunger valve is closed and closes a channel which leads through the valve plunger and/or valve body to the outlet chamber.

23 Claims, 2 Drawing Figures

PRESSURE REGULATOR

CROSS-REFERENCE TO RELATED APPLICATION

This is a continuation of application Ser. No. 121,548, filed Feb. 14, 1980, now abandoned.

BACKGROUND OF THE INVENTION

The present invention relates to a pressure regulator incorporating an inlet chamber, which can be connected to a variable pressure source, especially the master cylinder of a motor vehicle; an outlet chamber, which can be connected to a pressure consuming device, especially the wheel brake cylinders; a pin valve connected between inlet and outlet chambers; and a non-return valve, operating in by-pass; wherein the pin valve is opened, when the pressure is lower than the switching pressure, and closes against an opening force on the basis of a pressure exceeding the switching pressure and the non-return valve opens against a closing force on the basis of a pressure reduction in the inlet chamber relative to the outlet chamber. Pressure regulators of this type are known. Especially they are arranged in motor vehicles between the master cylinder and the wheel brake cylinders for the regulation of the braking force. These pressure regulators have the effect that above a predetermined switching pressure the pressure in the outlet chamber of the regulator is older than the pressure in the inlet chamber.

There is a distinction between pressure reducing valves and pressure limiting valves. The pressure reducing valves reduce, above the switching pressure, the pressure in the outlet chamber by one factor compared to the pressure in the inlet chamber. The pressure limiting valves limit the pressure in the outlet chamber to the value of the switching pressure. A pressure limiting valve of this type is, for instance, described in the German Pat. No. 1 170 740. With this known pressure limiting valve the non-return valve is provided by a movable, spring-supported valve seat for the plunger or pin valve. This valve seat is annularly constructed and encloses the valve plunger, wherein there remains a space between the valve seat and the valve plunger.

When assembling this known pressure limiting valve relatively many precision parts must be movably assembled to one another.

In the "Bremsenhandbuch", Bartsch-Verlag, Ottobrunn ner Munich, 5th edition 1977, page 146, a pressure reducing valve is described by means of FIG. 7. In this known pressure reducing valve there is a spring-loaded differential piston arranged between the inlet chamber and the outlet chamber, which has radial and axial bores leading from the inlet chamber to the outlet chamber. In the axial bore, a spring-loaded non-return valve is arranged which is compulsorily opened by the differential piston when the latter is being pushed forward into the outlet chamber by the spring assigned to it. For the production of the differential piston comparatively many manufacturing steps are necessary. Apart from that the differential piston must be of a multipart construction so that the non-return valve can be inserted into the axial bore of the differential piston.

The known devices have proved to be reliable. However, a further simplification with regard to the construction is desirable, since in car manufacture devices of this type must be produced on an assembly line due to the large number required.

SUMMARY OF THE INVENTION

Therefore, an object of the present invention is to provide a pressure regulator of the type mentioned above, which combined a high reliableness with a very simple construction.

A feature of the present invention is the provision of a pressure regulator comprising a housing; an inlet chamber disposed in the housing; an outlet chamber disposed in the housing; a plunger valve disposed in the housing between the inlet chamber and the outlet chamber, the plunger valve being opened when input pressure is lower than a predetermined switching pressure and being closed against an opening force when the pressure in the outlet chamber exceeds the switching pressure; and a non-return valve disposed in the housing which opens against a closing force when a pressure reduction in the inlet chamber relative to the pressure in the outlet chamber occurs, the non-return valve being in the form of a sealing lip disposed on a movable part of the plunger valve in a manner such that when the plunger valve is closed the sealing lip is situated in the inlet chamber and closes a channel which leads through a valve plunger and a valve body of the plunger valve to the outlet chamber.

On the basis of this construction, the non-return valve is practially a component of the plunger or pin valve and participates in its movements. The construction of the sealing lip is very simple and can also be realized in mass production with a very small expenditure of space and precision parts.

Compared with the known valve disclosed in the above-cited German patent the movable, spring-supported valve seat is saved. An advantage of this invention is that a valve seat, fixed at the housing, for the plunger valve is provided.

Compared with the differential piston of the pressure reducing valve disclosed in the above-cited "Bremsenhandbuch" the plunger valve has a considerably simpler construction, which is a great advantage. In particular the assembly of several precision parts is unnecessary.

The sealing lip in the form of a cup annularly enclosing the valve plunger has an especially high efficiency and service life, which is a great advantage.

In an arrangement where the valve body has a seal plate annularly enclosing the valve plunger and the seal plate cooperates with an annular valve seat at the housing, precisely treated sealing surfaces at the valve body are advantageously unnecessary.

Where the sealing lip is in a form of a cup, the sealing lip can be mounted onto the valve plunger together with the sealing plate.

Where the sealing lip has projecting parts directed toward the inlet chamber, this advantageously allows an especially safe fixing of the sealing lip and sealing plate at the valve body.

The production of a channel between the seal plate and valve body is especially simple since it is constructed as a groove in the sealing plate or the sealing cup and can be formed out of elastic plastic together with the sealing plate and the sealing cup.

The annular valve seat provided by an insert disposed in the housing advantageously allows, without any other modifications of the pressure regulator, to change the regulating action of the pressure regulator only by means of differently dimensioned valve seats. With different inserts for the valve seat, the regulating action of the pressure limiting valve or the regulating action of the pressure reducing valve can be adjusted.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
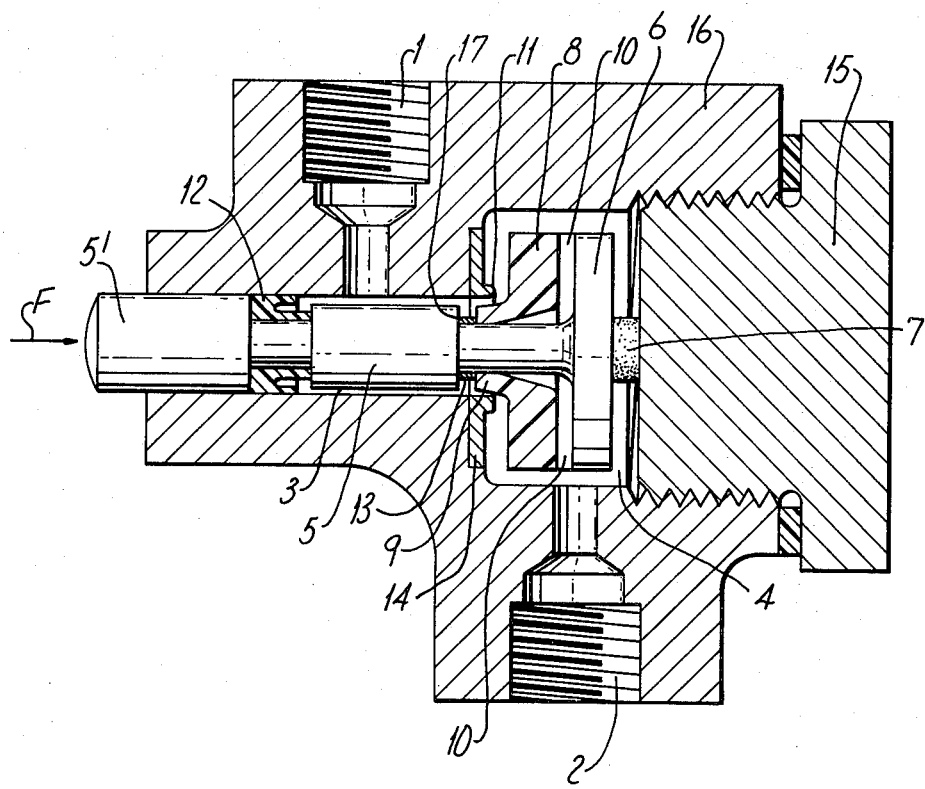
FIG. 1 is a partial longitudinal cross-sectional view of a pressure limiting valve in accordance with the principles of the present invention.

The pressure limiting valve shown in FIG. 1 has an inlet 1, which is connected to a pressure source (not shown) and an outlet 2, which is connected to a pressure consuming device (not shown). Inlet 1 leads into a cylindrical inlet chamber 3, which adjoins a cylindrical outlet chamber 4, which is coaxial to inlet chamber 3. Outlet 2 is connected to outlet chamber 4.

A plunger valve with a valve plunger 5 and a circular disc-shaped valve body 6 extends between the inlet chamber 3 and outlet chamber 4. At valve body 6 or the pipe plug 15 of outlet chamber 4 a stop 7 for the plunger valve is arranged for the purpose of limiting the opening of the plunger valve.

At valve body 6 a ring-shaped sealing plate 8, surrounding valve plunger 5, is disposed, which axially joins with a ring-shaped sealing cup 9 extending in the direction of inlet chamber 3. Sealing plate 8 has the same external diameter as valve body 6. Between sealing plate 8 and valve body 6 channels 10 are provided which from the outer circumference run radially to the interior and which, near valve plunger 5, branch off in an axial direction, directed toward sealing cup 9. Channels 10 are preferably constructed as grooves in sealing plate 8, since this is especially favorable with regard to production. An annular valve seat 11 is disposed opposite sealing plate 8 in housing 16. At the end of inlet chamber 3 spaced from valve seat 11 inlet chamber 3 is sealed by an end piece 5' of plunger 5 and a lip seal 12. The end piece 5' is guided in the sliding seat inside the bore forming inlet chamber 3. The plunger valve is, as shown, in an opening sense loaded by a force F, e.g. a spring (not shown). As shown plunger 5 has a smaller diameter than inlet chamber 3 so that between the wall of inlet chamber 3 and plunger 5 there remains an annular chamber for the passage of the hydraulic pressure fluid. Valve seat 11 has the same diameter as the bore receiving end piece 5' of valve plunger 5, so that the controlling action of a pressure limiting valve is achieved. The pressure limiting valve acts as follows.

Via inlet 1 the pressure of the pressure source reaches inlet chamber 3, then it reaches outlet chamber 4 and subsequently outlet 2. When the pressure exceeds a switching pressure, which is predetermined by the force F, valve body 6 is pressed against valve seat 11 and, thus, inlet chamber 3 is separated from outlet chamber 4.

In the example shown the diameter of annular valve seat 11 is chosen in such a way that with a closed plunger valve the pressure forces acting upon valve plunger 5 and valve body 6 or sealing plate 8, respectively, which partially act in the opening direction and partially in the sealing direction of the plunger valve, compensate each other. Thus, a further increase in pressure in inlet chamber 3 exceeding the switching pressure does not result in a lifting up of valve body 6 from valve seat 11 as long as the switching pressure in outlet chamber 4 continues to exist.

When the pressure in inlet chamber 3 is reduced below the switching pressure the overpressure now prevailing in outlet chamber 4 effects a lifting up of sealing lip 9 so that a pressure compensation can be effected through channels 10. Tjhus, the pressure in outlet chamber 4 drops below the switching pressure, so that the plunger valve opens again on the basis of the opening load by force F.

Figure 2:
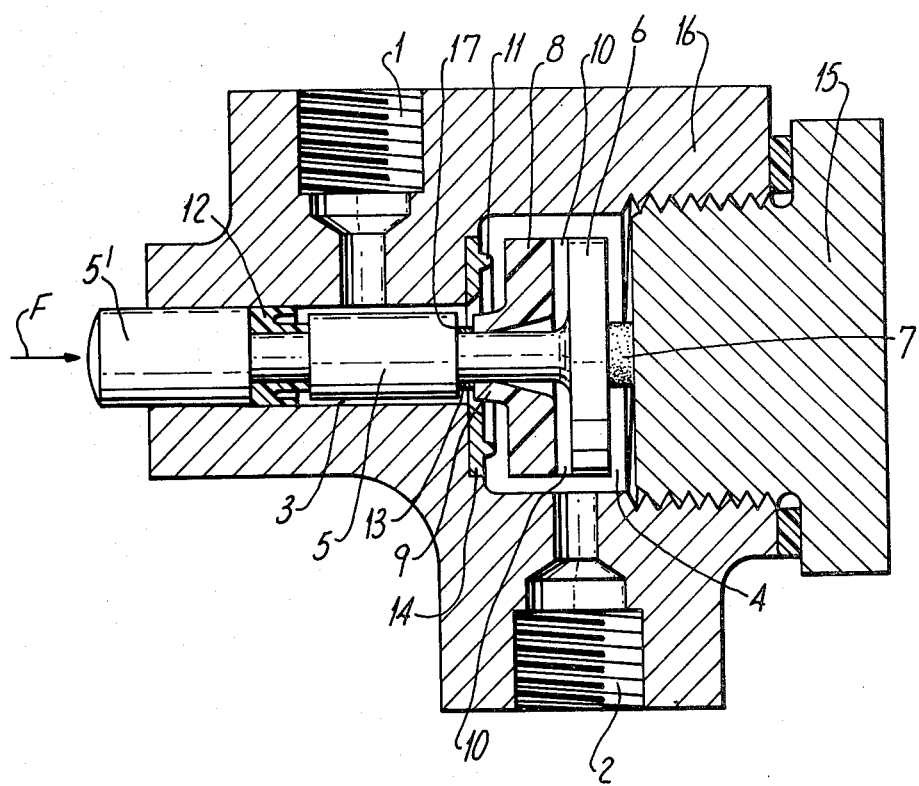
FIG. 2 is a partial longitudinal cross-sectional view of a pressure reducing valve in accordance with the principles of the present invention.

In FIG. 2 a pressure reducing valve is shown which differs from the pressure limiting valve of FIG. 1 in that the diameter of valve seat 11 is greater than the bore of inlet chamber 3 receiving end piece 5' of valve plunger 5.

This results in the following action. When the pressure in inlet chamber 3 and in outlet chamber 4 reaches the switching pressure, which is predetermined by the force F, the plunger valve closes. At this moment, the plunger valve is in an unstable state of equilibrium. With a further pressure increase in inlet chamber 3 the plunger valve moves forward and backward in rapid succession, that is it opens and closes alternately. In this process the plunger valve operates like a reducing valve wherein the relation of the pressures in inlet chamber 3 and outlet chamber 4 depends on the size of the annular surface disposed between annular valve seat 11 and the bore forming inlet chamber 3.

When the pressure in inlet chamber 3 is again reduced there is again a pressure compensation between inlet chamber 3 and outlet chamber 4 through channels 10 so that the plunger valve opens again when the pressure in outlet chamber 4 drops below the switching pressure.

As can be seen from these embodiments of the pressure regulator the force F predetermines the switching pressure. The dimension of annular valve seat 11 determines whether the pressure regulator functions as a pressure limiting valve or a pressure reducing valve. Above the switching pressure, the pressure in outlet chamber 4 compared to the pressure in inlet chamber 3 is reduced to a greater extent the smaller the diameter of valve seat 11 is.

As shown in the FIGS. 1 and 2 annular valve seat 11 is preferably constructed as an annular insert 14. Thus, it is sufficient to use an insert 14 with a valve seat 11 correspondingly dimensioned according to whether the pressure regulator according to this invention shall be used as a pressure reducing valve or a pressure limiting valve. As a result, housing 16 can remain unchanged.

Projections 13 are provided at sealing lip 9, which push against a step 17 in valve plunger 5, in order to ensure that sealing plate 8 and the sealing cup 9 connected thereto do not slip over valve plunger 5. Projections 13 are annularly spaced so as to not block pressure fluid flow through sealing lip 9.

While I have described above the principles of my invention in connection with specific apparatus, it is to be clearly understood that this description is made only by way of example and not as a limitation to the scope of my invention as set forth in the objects thereof and in the accompanying claims.

I claim:
1. A pressure regulator comprising:

a housing;

an inlet chamber disposed in said housing;

an outlet chamber disposed in said housing;

a plunger valve disposed in said housing between said inlet chamber and said outlet chamber, said plunger valve being opened when input pressure is lower than a predetermined switching pressure and being closed against an opening force when the pressure in said outlet chamber exceeds said switching pressure;

a non-return valve disposed in said housing which opens against a closing force when a pressure reduction in said inlet chamber relative to the pressure in said outlet chamber occurs, said non-return valve being in the form of a sealing lip disposed on a movable part of said plunger valve in a manner such that when said plunger valve is closed said sealing lip is situated in said inlet chamber and closes a channel which leads through a valve plunger and a valve body of said plunger valve to said outlet chamber; and a sealing plate fastened to said valve body annularly enclosing said valve plunger, said sealing plate cooperating with an annular valve seat disposed between said inlet and outlet chambers in a recess of said housing, said annular valve seat being an interchangeable insert disposed in said recess.

2. A regulator according to claim 1, wherein said sealing lip is in the form of a cup annularly enclosing said valve plunger.

3. A regulator according to claim 1, wherein said sealing lip is a cup-shaped extension of said sealing plate.

4. A regulator according to claim 3, wherein said sealing lip includes annularly spaced projecting parts on the end thereof adjacent said inlet chamber, said projecting parts engaging said valve plunger to axial space said sealing lip with respect to said plunger valve and maintain a passage for pressure fluid.

5. A regulator according to claim 4, wherein said sealing lip is disposed in an annular depression of said valve plunger, and
said projecting parts engage a step at one end of said annular depression.

6. A regulator according to claim 3, wherein said channel is disposed between said sealing plate and said valve body and between said valve plunger and said sealing lip.

7. A regulator according to claim 6, wherein said channel includes a radially extending groove in said sealing plate.

8. A regulator according to claim 7, wherein said channel further includes an axially extending groove in said sealing plate and said sealing lip connected to said radially extending groove.

9. A regulator according to claim 1, wherein said channel is disposed between said sealing plate and said valve body and between said valve plunger and said sealing lip.

10. A regulator according to claim 9, wherein said channel includes a radially extending groove in said sealing plate.

11. A regulator according to claim 10, wherein said channel further includes an axially extending groove in said sealing plate and said sealing lip connected to said radially extending groove.

12. A regulator according to claim 1, wherein said valve body is a round disc,
said outlet chamber is cylindrical and receives said valve body coaxially therein,
said valve seat is disposed in the transverse wall of said outlet chamber adjacent said inlet chamber,
said outlet chamber joining said inlet chamber in a step with said inlet chamber having a smaller diameter bore than said outlet chamber, and
said valve plunger is guided in said inlet chamber.

13. A regulator according to claim 12, wherein at least a portion of said valve plunger and said sealing lip are disposed in said inlet chamber with a clearance between the outer surfaces thereof and the inner wall of said inlet chamber.

14. A regulator according to claim 13, wherein a plurality of said channels are provided equally spaced with respect to each other.

15. A regulator according to claim 1, wherein a plurality of said channels are provided equally spaced with respect to each other.

16. A pressure regulator comprising:

an inlet chamber disposed in a housing;

an outlet chamber disposed in said housing;

a plunger valve disposed in said housing between said inlet chamber and said outlet chamber, said plunger valve being opened when input pressure is lower than a predetermined switching pressure and being closed against an opening force when the pressure in said outlet chamber exceeds said switching pressure, said plunger valve including a valve plunger guided in and sealed to said inlet chamber and a valve body disposed in said outlet chamber connected to said valve plunger;

a non-return valve disposed in said housing which opens against a closing force when a pressure reduction in said inlet chamber relative to the pressure in said outlet chamber occurs after achieving said switching pressure and said plunger valve is closed, said non-return valve including a flexible sealing lip disposed annularly about said valve plunger extending from a point adjacent said valve body toward said inlet chamber such that when said plunger valve is closed said sealing lip is situated in said inlet chamber, said sealing lip being pressed against the outer surface of a portion of said valve plunger by pressure in said inlet chamber when said plunger valve is closed to close a channel extending from said inlet chamber to said outlet chamber located between the inner surface of said sealing lip and the outer surface of said portion of said valve plunger and said sealing lip being lifted from the outer surface of said portion of said valve plunger by pressure in said outlet chamber when said plunger valve is closed and said pressure reduction occurs to open said channel; and a sealing plate fastened to said valve body between said valve body and said sealing lip annularly enclosing said valve plunger, said sealing plate cooperating with an annular valve seat disposed between said inlet and outlet chambers in a recess of said housing.

17. A regulator according to claim 16, wherein said sealing lip is a cup-shaped extension of said sealing plate.

18. A regulator according to claim 16, wherein said annular valve seat is an interchangeable insert disposed in said recess.

19. A regulator according to claim 16, wherein said channel includes a radially extending groove in said sealing plate.

20. A regulator according to claim 19, wherein said channel further includes an axially extending groove in said sealing plate and said sealing lip connected to said radially extending groove.

21. A regulator according to claim 20, wherein said annular valve seat is an interchangeable insert disposed in said recess.

22. A regulator according to claim 20, wherein a plurality of said channels are provided equally spaced with respect to each other.

23. A regulator according to claim 22, wherein said annular valve seat is an interchangeable insert disposed in said recess.

* * * * *